Aug. 30, 1927.
R. H. CONN
1,640,599
PROCESS OF MANUFACTURING FISH LURES
Filed April 2, 1925
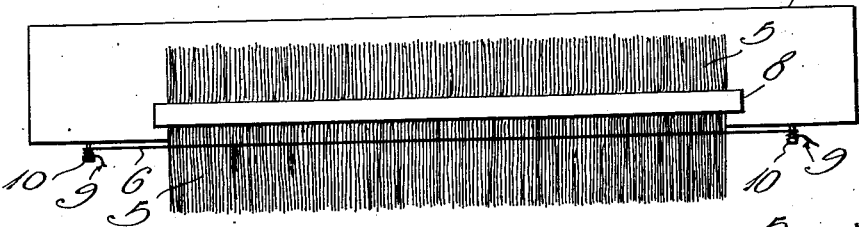
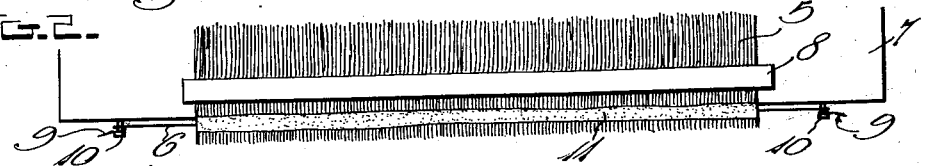
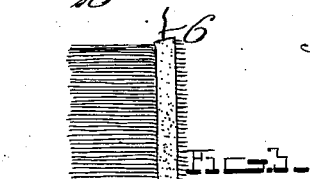
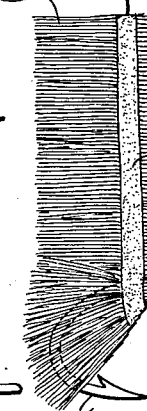
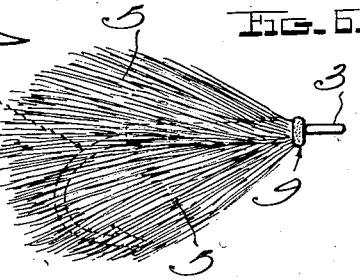
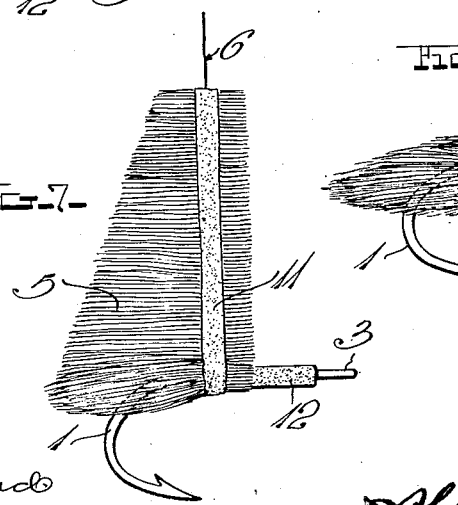
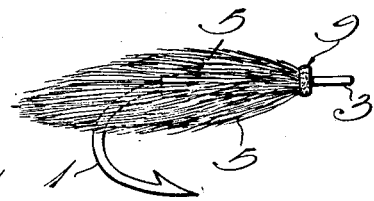
Witness
J. Woodard
Inventor
R. H. Conn
By H. B. Wilson & Co.
Attorneys Patented Aug. 30, 1927.

1,640,599

UNITED STATES PATENT OFFICE.

RAY H. CONN, OF WINAMAC, INDIANA.

PROCESS OF MANUFACTURING FISH LURES.

Application filed April 2, 1925. Serial No. 20,269.

My invention relates to the manufacture of fish lures of the type in which a multiplicity of hairs or other flexible filaments, are secured upon a body (usually a fish hook) to represent some living creature and thus form effective bait. While lures of the general type to which the invention relates have heretofore existed, it is the object of my invention to provide a new and improved process for their manufacture, said process being such as to unite the hairs or other filaments with the body in a permanent manner.

With the foregoing in view, the invention resides in the novel subject matter hereinafter fully described and claimed, the description being supplemented by the accompanying drawing.

Figures 1 to 5 are elevations showing different steps in the manufacture of the lure.

Figure 6 is a side elevation of the completed bait or lure formed by the steps shown in Figs. 1 to 5.

Figure 7 is an elevation illustrating the manner of constructing a different form of lure.

Figure 8 is a side elevation of a bait constructed in accordance with the disclosure of Fig. 7.

I have illustrated and described in detail, the preferred steps in the manufacture of a fish lure, but it is to be understood at the outset that the invention is not restricted in its broadest aspect, to the exact details and order of steps, herein set forth.

In the present disclosure of the invention, I first take a body 1, preferably a fish hook, and wrap a suitable portion thereof with silk or some other suitable flexible strand, and if the body be a fish hook, its shank is thus wrapped, leaving the eye 3 of said shank exposed, if said shank be provided with an eye, it being understood of course, that a hook could also be used of the type directly secured to a gut leader.

To the wrapping 2, I apply a coating 4 (Fig. 5) of any appropriate, fluid, waterproof, cementing substance, liquid celluloid being preferably employed for this purpose.

At 5, in the drawing, a multiplicity of flexible filaments, preferably hairs from the hide of an animal, are shown, and the numeral 6 designates a strand of silk or other desired material. I relatively position a multiplicity of the filaments 5 and the strand 6, so that the former extend transversely of the latter. To accomplish this, I prefer to lay a row of the filaments 5 upon a board or other support 7, with their ends projecting beyond one edge of such support, a weight 8 being preferably laid on the filaments to temporarily hold them in the orderly fashion in which they have been laid. I then lay the strand 6 upon the filaments 5 and connect its ends 9 to tacks or the like 10 which may be driven into one edge of the support 7, so as to tightly hold the strand in place upon the filaments. This having been done, a fluid, water-proof, cementing substance, such as liquid celluloid, is applied to the strand 6 and the portions of the filaments 5 along the same. The ends of the filaments, projecting beyond the support 7, are then trimmed on a line substantially parallel with the strand 6 as will be clear from Fig. 2. If, in the completed lure, the filaments 5 are intended to project quite a distance from the hook or other body 1, as indicated in Fig. 6, the trimming of the filaments 5 is effected rather close to the strand 6, but if said filaments are to lie in rather compact relation, as indicated in Fig. 8, the filaments are trimmed a greater distance from the strand 6, as disclosed in Fig. 7.

After trimming the filaments 5, I apply a second coating 12 of the fluid cement, to the coating 4 around the wrapping 2. Then, while this coating and the cement 11 are still viscous, I release the ends of the strand 6, place one end 9 of said strand upon the coating 12 as indicated in Fig. 3, and wrap this end around said coating, in the direction indicated by the arrow in the figure in question. I then proceed to wrap the major portion of the strand 6 and the filaments 5 about the cement-coated body, and finally the other end 9 of the strand 6 is wrapped about said body to form a simulation of a head, as disclosed in Figs. 6 and 8, this head being then given a coat of the fluid cement. It is of course to be understood that while wrapping the major portion of the strand 6 and its filaments 5 about the coated body 1, they are gradually advanced from one end of the latter toward the other end thereof and the strand is kept tight while wrapping, so as to hold it against twisting and to tightly bind the filaments in place. When now, the cement hardens, that applied to the body and that applied to the strand and filaments, become a single mass and thus said filaments are effectively and permanently secured in place, in positions extending longitudinally of the lure, in orderly fashion.

In actual practice, I have found that if the butt ends of the filaments 5 are left short, as shown in Figs. 2, 3 and 4, tight wrapping of the strand 6 carrying said filaments, will cause the latter to project widely from the body 1, although still extending in the general direction of the length of said body, producing a very fluffy lure, such as that disclosed in Fig. 6, simulating a hackle fly. If the butt ends of the filaments are comparatively long however, said filaments will lie in compact relation as disclosed in Fig. 8, in the completed article, effectively simulating a minnow.

The filaments 5 need not be of uniform length or color, the most appropriate lengths and colors being used, according to the appearance desired in the completed article.

As excellent results have been obtained from the steps in the order herein set forth, the present application may be considered as setting forth the preferred process for the manufacture of the lure. However, it is to be further understood that within the scope of the invention as claimed, numerous variations may be made.

I claim:

1. A process of forming a fish lure having a mass of filaments all extending longitudinally of the lure, consisting in securing a multiplicity of flexible filaments to a strand in transverse relation to the latter with the filaments projecting in opposite directions only from the strand, wrapping the strand and filaments around a body and holding the strand against twisting while performing the wrapping operation, and securing the free end of the strand to the body.

2. The process of forming a fish lure, consisting in relatively placing a strand and a multiplicity of flexible filaments to dispose the latter transversely of the former, applying a fluid water-proof cement to the strand and the portions of the filaments along the same, and with the filaments projecting in opposite directions only from the strand, wrapping the strand and filaments around a body before the cement has dried, whereby the latter will secure said strand and filaments to the body.

3. The process of forming a fish lure, consisting in securing a multiplicity of flexible filaments to a strand in transverse relation to the latter, with the ends of the strand extending beyond the filaments, coating a body with a fluid water-proof cement, wrapping one extended end of the strand around the coated body before drying of the coating, wrapping the major portion of the strand and the filaments thereon around the coated body before the drying of the coating, and wrapping the other extended end of the strand around the coated body before the drying of the coating.

4. The process of forming a fish lure, consisting in relatively placing a strand and a multiplicity of flexible filaments to dispose the latter transversely of the former, applying a fluid water-proof cement to the strand and the portions of the filaments along the same, coating a body with a fluid water-proof cement, and wrapping the strand and filaments around the coated body before either the first or the last mentioned cement is dry, whereby upon the drying of the cement the filaments and strand will be secured to the body.

In testimony whereof I have hereunto affixed my signature.

RAY H. CONN.